United States Patent [19]

Yoshii

[11] Patent Number: 5,058,100
[45] Date of Patent: Oct. 15, 1991

[54] DISC MAGAZINE

[75] Inventor: Tetsuji Yoshii, Neyagawa City, Japan

[73] Assignee: Matsushita Electric Industrial Co., Ltd., Kadoma, Japan

[21] Appl. No.: 391,281

[22] Filed: Aug. 9, 1989

[30] Foreign Application Priority Data

| May 18, 1988 | [JP] | Japan | 63-205175 |
| Jun. 22, 1988 | [JP] | Japan | 1-160378 |
| Aug. 10, 1988 | [JP] | Japan | 63-199662 |
| Aug. 10, 1988 | [JP] | Japan | 63-199663 |
| Aug. 10, 1988 | [JP] | Japan | 63-199664 |
| Aug. 18, 1988 | [JP] | Japan | 63-205173 |
| Aug. 18, 1988 | [JP] | Japan | 63-205174 |
| Sep. 30, 1988 | [JP] | Japan | 63-248209 |
| Oct. 21, 1988 | [JP] | Japan | 63-266406 |

[51] Int. Cl.$^5$ .......... G11B 7/26; G11B 17/22; B65D 85/30
[52] U.S. Cl. .................. 369/291; 369/34; 369/36; 206/444
[58] Field of Search ........... 369/291, 292, 290, 75.1, 369/75.2, 77.1, 77.2, 36, 37, 38, 39, 35

[56] References Cited

U.S. PATENT DOCUMENTS

| 2,298,447 | 10/1942 | Wright | 369/38 |
| 4,625,304 | 11/1986 | Kanamaru et al. | 369/75.2 |
| 4,701,900 | 10/1987 | Hasegawa et al. | 369/36 |
| 4,737,945 | 4/1988 | Yamazaki et al. | |
| 4,928,271 | 5/1990 | Verhagen | 369/291 X |

FOREIGN PATENT DOCUMENTS

| 0267547 | 5/1988 | European Pat. Off. |
| 0225766 | 10/1988 | European Pat. Off. |
| 8532586 | 2/1986 | Fed. Rep. of Germany . |
| 2004274 | 11/1969 | France . |
| 61-59660 | 3/1986 | Japan . |
| 63-48675 | 3/1988 | Japan . |
| 63-58358 | 4/1988 | Japan . |
| 63-58378 | 4/1988 | Japan . |
| 63-271780 | 11/1988 | Japan . |
| 63-271781 | 11/1988 | Japan . |
| 2160349 | 12/1985 | United Kingdom . |
| 2185878 | 8/1987 | United Kingdom . |

Primary Examiner—Stuart S. Levy
Assistant Examiner—Kenneth B. Wells
Attorney, Agent, or Firm—Cushman, Darby & Cushman

[57] ABSTRACT

A disc magazine has plural partition plates (3) piled up in the opening (2) of the magazine case (1) Making plural slots (90), and plural disc carrier (10) to be slid toward the opening (2), and plural elastic stoppers (13) for guiding standard or larger disc (4) over the disc carrier (10) while stopping smaller disc (34) by the inside (front) arc edge (11) of the disc carrier (10), so that plural discs of different sizes can be received in the plural slot in a manner that the front edges of the received discs of different sizes are on substantially equal positions in all the slots (90) in the opening (2).

37 Claims, 13 Drawing Sheets

DISC MAGAZINE

FIELD OF THE INVENTION AND RELATED ART STATEMENT

1. Field of the Invention

The present invention related to a disc magazine to be used for receiving a plurality of discs of different sizes, for example, compact discs (CD) of two different sizes, to enable receipt therein directly without any adapter for adjusting size.

2. Description of the Related Art

Recently, a variety of disc magazines for receiving and containing optical audio discs, for example, those known as compact discs (CDs) have been manufactured with the spread of automatic disc changers for use in automobile. Now, the CDs of two different diameters are on the market. First ones are those of standard type having diameter of 12 cm. The others are those of smaller type or single type having diameter of 8 cm. Accordingly, two kinds of the disc magazines, or an adapter for adjusting to the small type ones has been necessary to receive the all kinds of the CDs. In other words, there is a demand for a disc magazine which is usable for two sizes of discs without use of the adapter.

OBJECT AND SUMMARY OF THE INVENTION

It is an object of the present invention to provide a disc magazine which can receive a plurality of discs of two different sizes without use of an adapter for size adjusting.

The present invention can provide a disc magazine which has substantially the same size as a conventional disc magazine for 12 cm disc, namely, a disc magazine which can detect a different type discs and provide a loading means for various discs in a limited space.

The present invention can provide a disc magazine which can steadily retract the discs of two sizes and can receive them certainly.

The present invention can provide a disc magazine wherein two kind of discs are judged in the disc magazine by its sizes.

The disc magazine in accordance with the present invention comprises:

a magazine case, plural partition plates which are held horizontally in the magazine case for defining therebetween plural slots for containing plural discs to be inserted from a front opening of the magazine case, plural disc carrier means which are held horizontally and slidably on and at the rear side of the plural partition plates in the magazine case, and plural disc supporter members which are provided on the plural disc carrier means for supporting smaller size discs on the disc carrier means.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENT

Hereafter, a preferred embodiment of the present invention is described with reference to the accompanying drawings.

Figure 1:
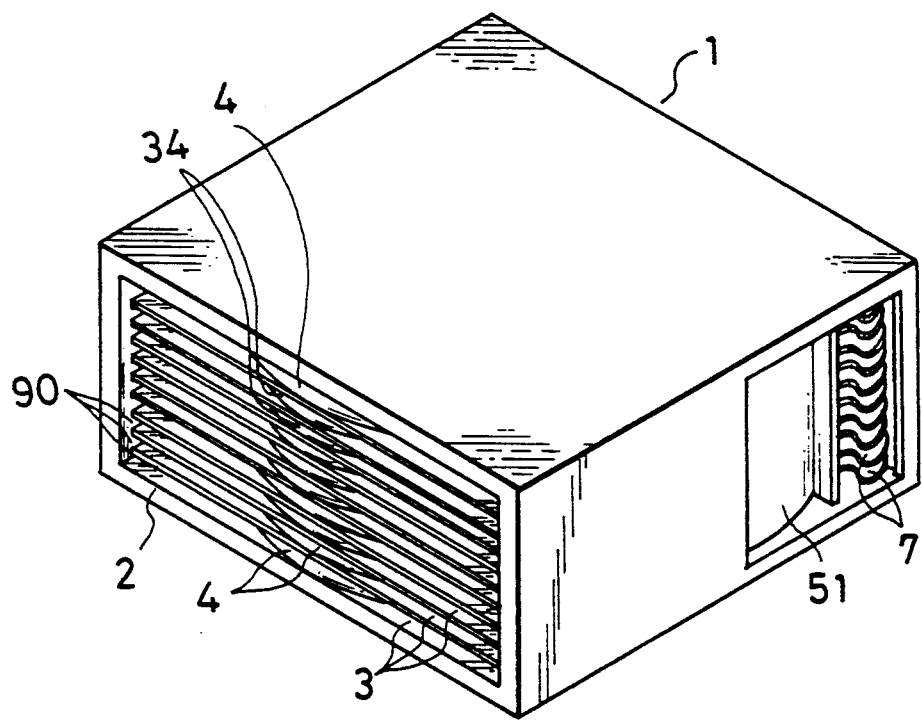
FIG. 1 is a perspective view of a disc magazine embodying the present invention.

FIG. 1 is a perspective view of a disc magazine of a preferred embodiment in accordance with the present invention. In FIG. 1, a front opening 2 for inserting or projecting a disc, such as compact disc (CD), is provided on the front of a magazine case 1. Plural partition plates 3 are mounted levelly at regular intervals along vertical direction in the opening 2 thereby defining the disc-containing spaces. The front opening 2 of the magazine case 1 are divided into plural slots 90 by the plural partition plates 3. Plural CD 4, 34 are loaded in the plural slots 90 respectively, and received in the magazine case 1.

Figure 2:
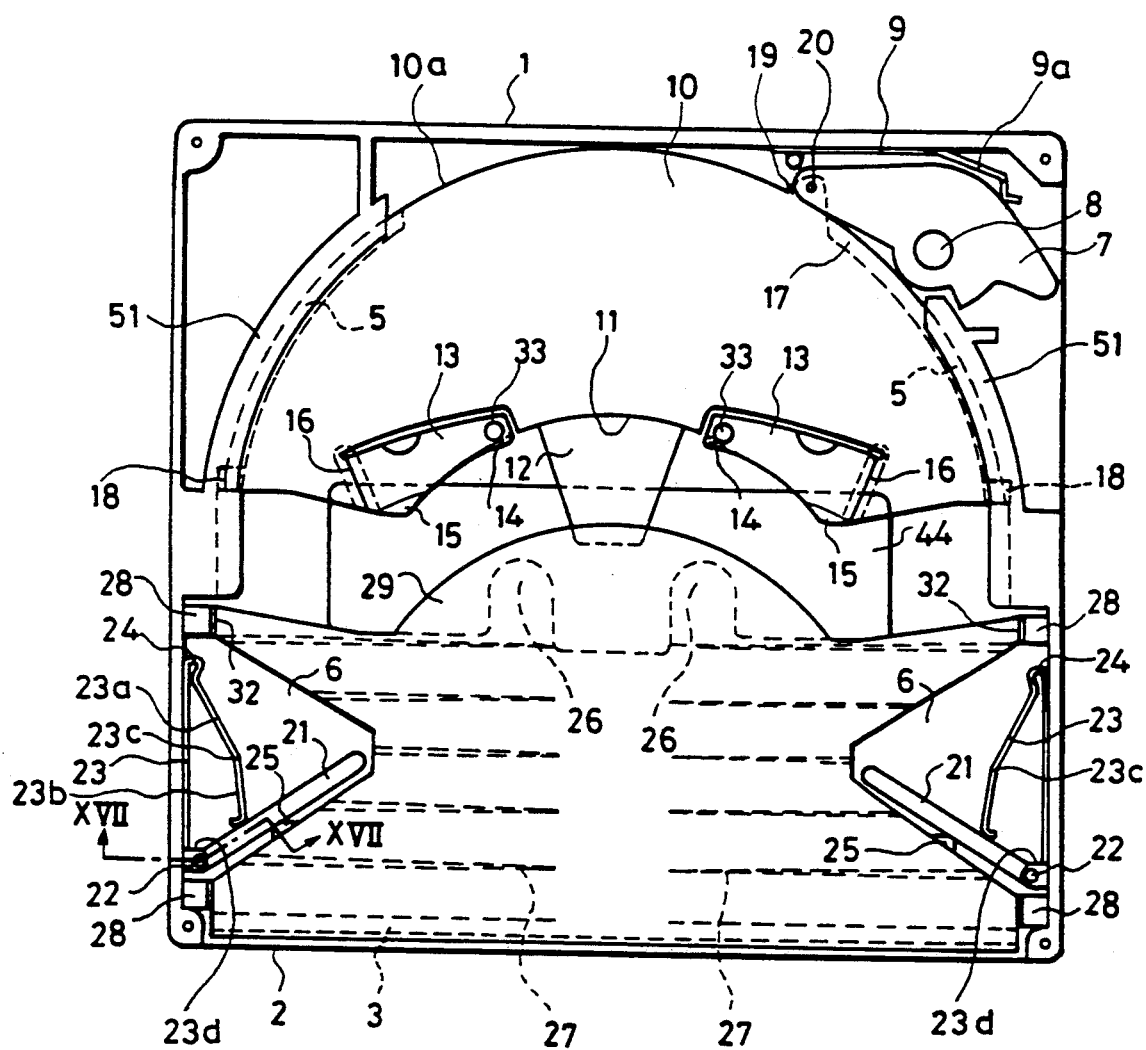
FIG. 2 is a horizontal inside view the disc magazine of FIG. 1.
Figure 3:
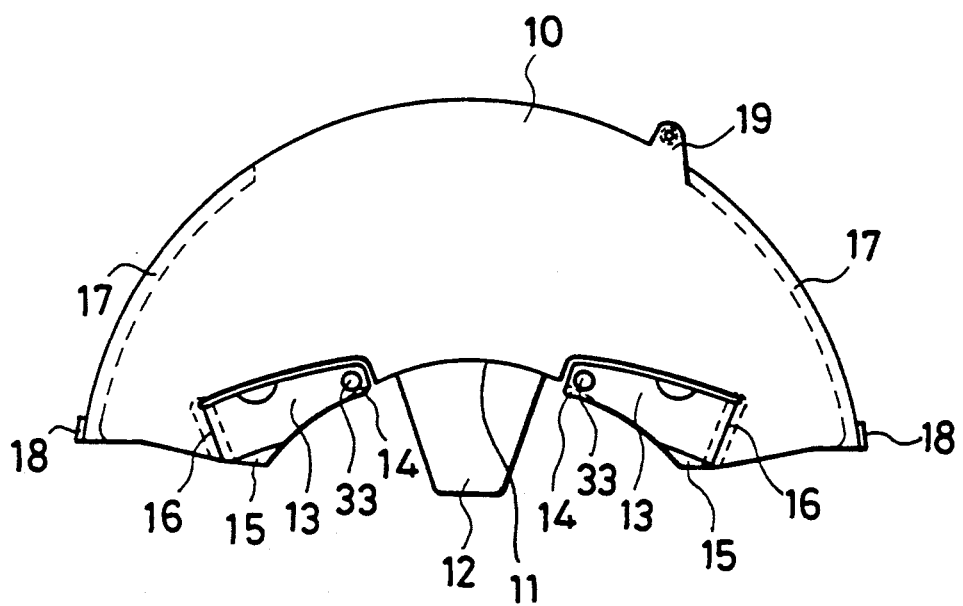
FIG. 3 is a plan view of a disc carrier of FIG. 2.

FIG. 2 is a horizontal inside view of FIG. 1, and shows interior construction of the magazine case 1. In FIG. 2, the above-mentioned partition plate 3 is shown at the under side as the front of the magazine case 1. A disc carrier 10 having a fan shape as shown in FIG. 3 is provided in a slot 90 at the rear side of the partition plate 3. Both of the upside faces of the disc carrier 10 and the partition plate 3 are arranged on an even horizontal face. The disc carrier 10 is held by grooved guides 5 which are provided in frames 51, 51 integrated with the magazine case 1. And the disc carrier 10 is constructed to slide in the forward and backward of the magazine case 1 along the grooved guides 5. In FIG. 2, a connecting portion 19 of the disc carrier 10 and a kick lever 7 behind the disc carrier 10 are connected by a connecting pin 20. Therefore, when the kick lever 7 is turned by a finger or a suitable linkage around a kick-lever shaft 8 anti-clockwise, the disc carrier 10 is slid forward, i.e. toward the front side. And, since the kick lever 7 is always pressed clockwise by kick-lever spring 9, the kick lever 7 is restored to the position shown in FIG. 2 when the finger or the suitable linkage is removed. A diameter of the outer arc 10a of the disc carrier 10 has substantially the same diameter as the standard disc 4 having a diameter of 12 cm. A diameter of the inner arc 11 of the disc carrier 10 has substantially the same diameter as the small type CD 34 having a diameter of 8 cm. FIG. 3 is a plan view of the disc carrier 10 of FIG. 1. As shown in FIG. 3, two elastic stoppers 13, 13 are provided on the inner arc 11 at the parts near both ends of the inner arc 11 of the disc carrier 10. The elastic stoppers 13, 13 are connected to the disc carrier 10 by a thin hinge 16 which are at the parts near the inner arc 11. Each elastic stopper 13 is mounted to lean upside at its free end which is near the center of the inner arc 11. And, each elastic stopper 13 has an inclined guide-face 15 at a portion of the front side thereof. The inclined guide-face 15 is formed to lean forward-falling-down. Thus, when the standard disc 4 is inserted, the edge of the standard disc 4 touches over the inclined guide-face 15 of the elastic stopper 13 to be depressed thereby to guide the standard disc forward over the disc carrier 10.

Figure 4:
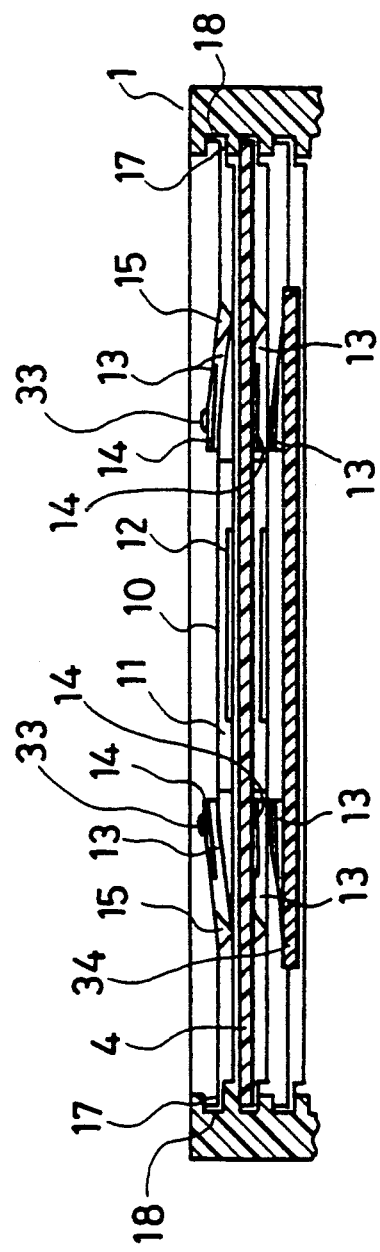
FIG. 4 is an elevation view partly in section of a disc magazine of the present invention.

FIG. 4 is an elevation view partly in section of a disc magazine which receives a standard disc 4 and a small type CD 34. FIG. 4 shows that elastic stoppers 13, 13, at the slot 90 which receives the standard disc 4, are depressed by the standard disc 4.

As shown in FIG. 2 and FIG. 3, a disc supporter 12, which is thinner than the disc carrier 10, is provided extending from the bottom face of the disc carrier 10. Thus, the disc supporter 12 and the disc carrier 10 are slid at the same time by driving of the kick lever 7. The disc supporter 12 is tongue-shaped as shown in FIG. 2 and a small type CD 34 which is loaded in a slot 90 is supported by the disc supporter 12. Therefore, when the disc carrier 10 is driven forward by the kick lever 7, the small type CD 34 is slid in a direction to the front side.

Figure 5:
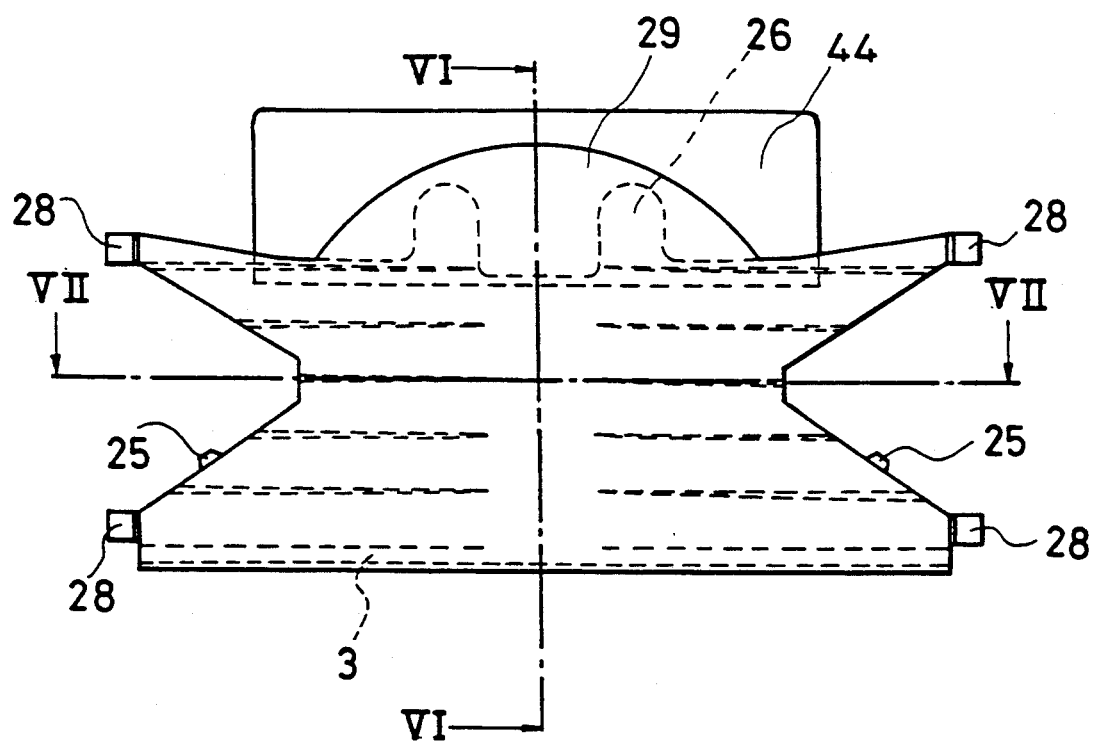
FIG. 5 is a plan view of a partition plate portion of FIG. 2.
Figure 5A:
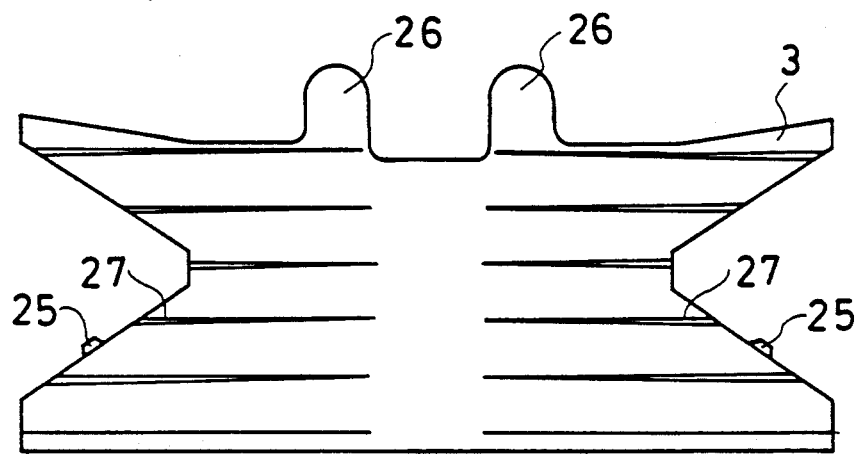
FIG. 5(a) is a plan view of a partition plate of FIG. 5.
Figure 5B:
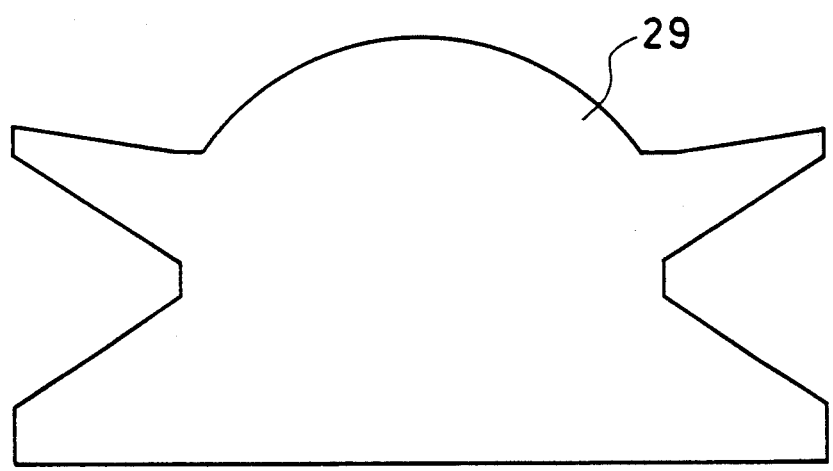
FIG. 5(b) is a plan view of a liner sheet of FIG. 5.
Figure 5C:
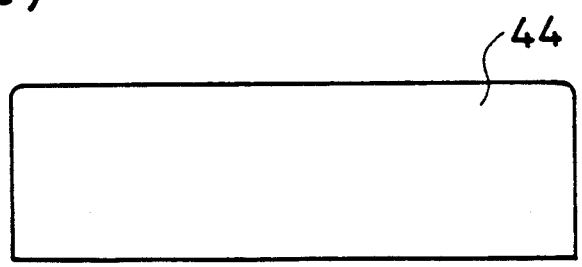
FIG. 5(c) is a plan view of a thin film 44 of FIG. 5.
Figure 6:
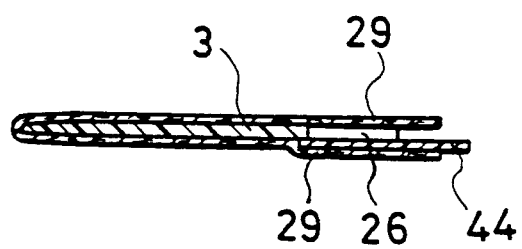
FIG. 6 is a cross-sectional view taken on line VI—VI of FIG. 5.
Figure 7:
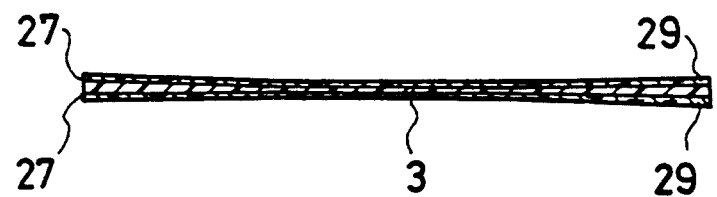
FIG. 7 is a cross-sectional view taken on line VII—VII of FIG. 5.

FIG. 5 is a plan view of the partition plate portion of FIG. 2. FIG. 6 is a cross-sectional view taken on line VI—VI of FIG. 5. FIG. 7 is a cross-sectional view taken on line VII—VII of FIG. 5. Non-woven fabric or woven cloth are put by adhesive or by melting on the both sides the partition plate 3 as liner sheets 29 as shown in FIG. 6. Also, a thin film 44 such as thin plastic film is bonded on the upper face of the lower liner sheet 29. FIG. 5(a) is a plan view of a partition plate 3. FIG. 5(b) is a plan view of a liner sheet 29. FIG. 5(c) is a plan view of a thin film 44. Front end tip of the above-mentioned disc supporter 12 is arranged between the upper liner sheet 29 and the thin film 44 as shown in FIG. 2. Two projections 26, 26 of the partition plate 3 are provided to enforce the arc shaped upper and lower liner sheet 29, 29. The disc supporter 12 is inserted between the projections 26, 26 when the disc supporter 12 is slid forward integrally with the disc carrier 10.

As shown in FIG. 5 and FIGS. 5(a), plural ribs 27 are provided symmetrically on the both sides of the partition plate 3. Each rib 27 is shaped to have such taper that outside is high and inside (center side) is low as shown in FIG. 7. As a results, a standard disc 4, or a small type CD 34 loaded in a slot 90 is supported point-contacts of its periphery with ridges of the ribs 27. Therefor, the face thereof is protected from damaging. The both, left and right, sides of the partition plate 3 have large notches 6, 6 of triangular shape. In each notch 6, a holder arm 21 is mounted rotatably around an arm pin 22 mounted on the magazine case 1. Each holder arm 21 is pressed by an arm spring 23 toward center of the magazine case 1. Therefore, the holder arms 21 contacts to stoppers 25 by arm springs 23, 23 which is provided between the partition plate 3 as shown in FIG. 2 when a disc is not loaded.

In the disc magazine of this embodiment, the above-mentioned disc carrier 10 having the elastic stoppers 13, 13 a kick lever 7, a pair of holder arms 21, 21 are provided in each of above-mentioned slot 90.

Figure 8:
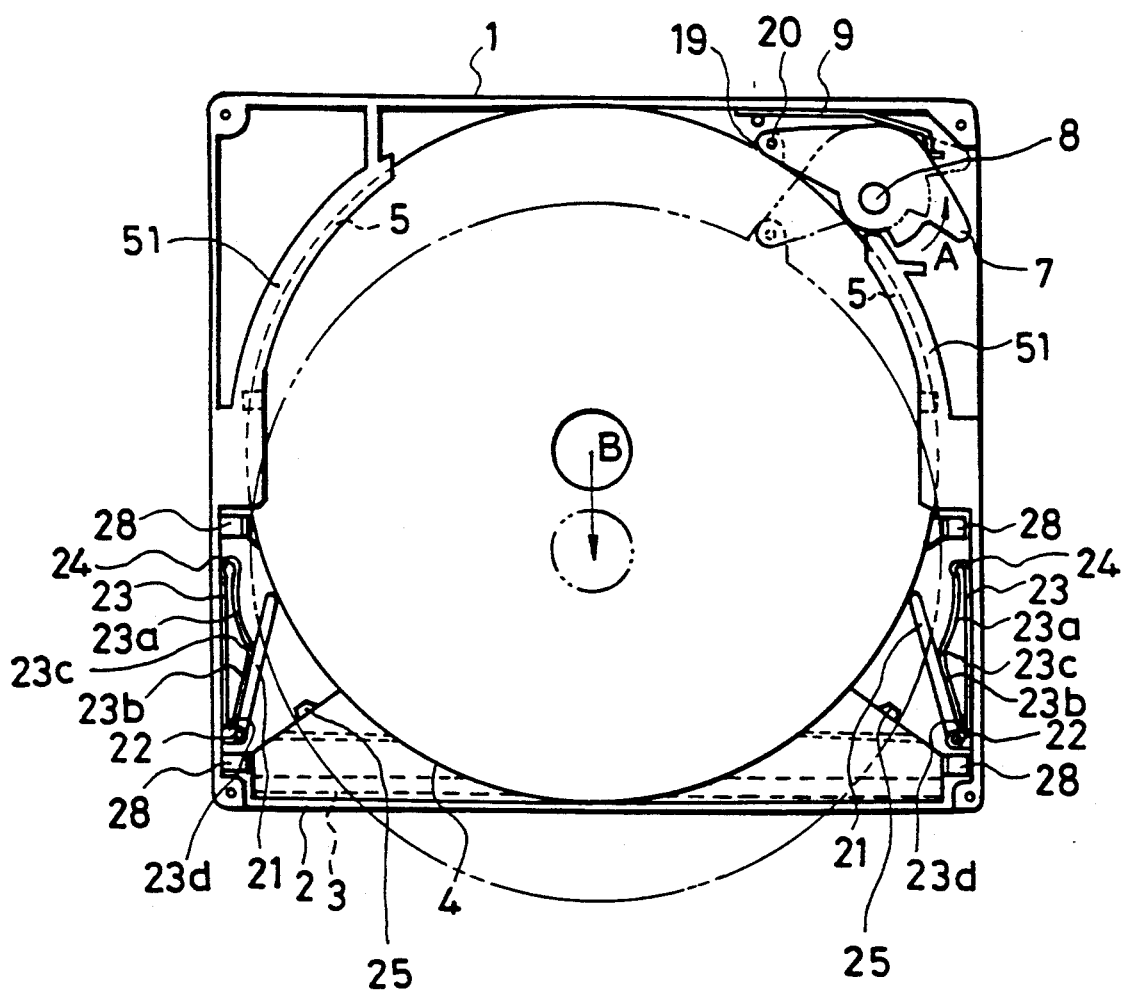
FIG. 8 shows an inside of a slot wherein a standard disc is received.
Figure 9:
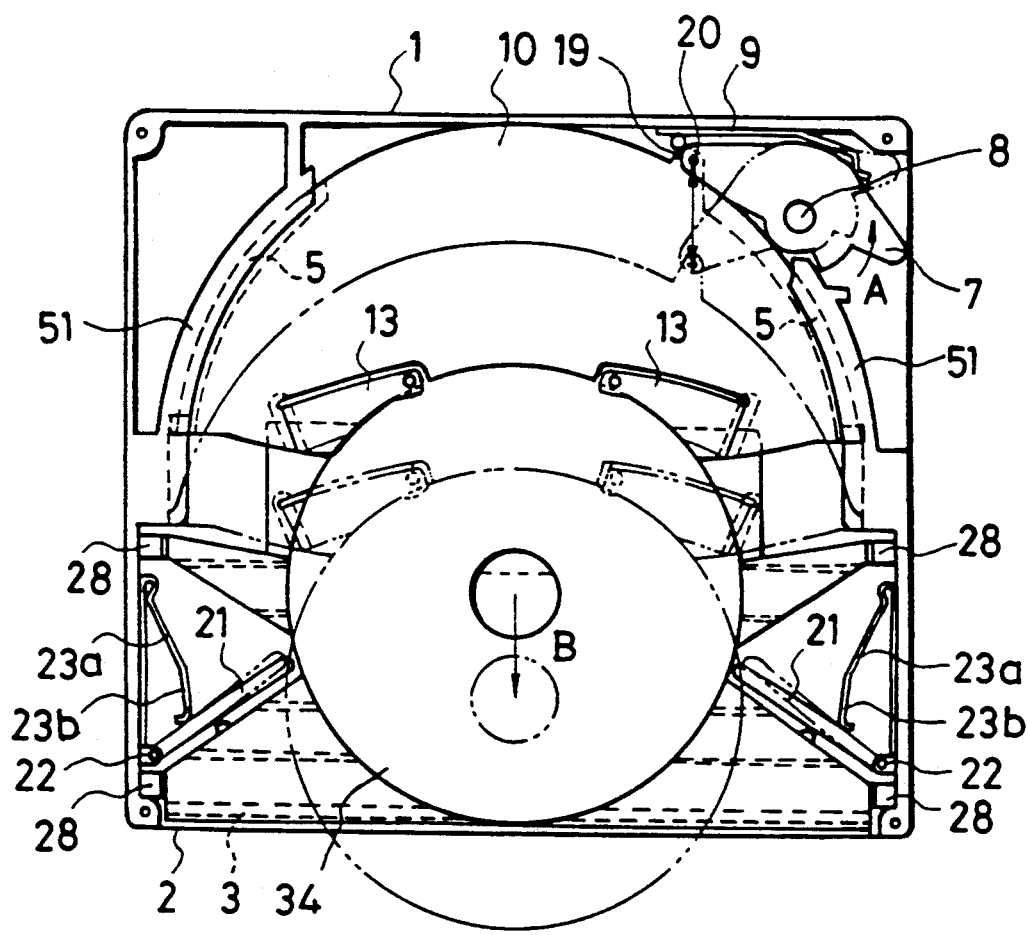
FIG. 9 shows an inside of a slot wherein a small type disc is received.

The operation of the above-mentioned disc magazine in accordance with the present invention is elucidated hereafter with reference to the drawings of FIG. 2, FIG. 8 and FIG. 9. FIG. 8 shows an inside of a slot 90 wherein a standard CD 4 is loaded. And, FIG. 9 shows an inside of a slot 90 when a small type CD 34 is loaded.

The following is explanation of retraction of a standard CD 4. In the state of the disc magazine as shown in FIG. 2, when the standard CD 4 which has a diameter of 12 cm is inserted in a selected slot 90, the peripheral edge of the standard CD 4 pushes both of the holder arms 21, 21 overcoming the force of the arm spring 23. And, the holder arms 21, 21 are pushed maximum at the time when the center part, which is between the front end and the innermost end, of the standard CD 4 passes by the end tips of the holder arms 21, 21. And when the standard CD 4 is further inserted into the slot 90, the standard CD 4 is pressed inside so as to be inserted inward by the force of arm spring 23. Therefore, the standard CD 4 is automatically taken in the slot 90 after the center part or the maximum width part of the standard CD 4 passes the contact points of the standard CD 4 with the end tips of the holder arms 21, 21. At this time, as the standard CD 4 has a diameter of 12 cm, the edge of the standard CD 4 contacts the inclined guide-faces 15, 15 of the elastic stoppers 13, 13. And, the elastic stoppers 13, 13 are depressed down by the edge of the standard CD 4. Thus, the standard CD 4 is inserted smoothly inside to the innermost end, so that the edge of the standard CD 4 does not contact the inner arc face 11 of the disc carrier 10, but is brought over the disc carrier 10 by sliding on the inclined guide-face 15. And finally, the standard CD 4 is completely received on the disc carrier 10 as shown by a solid line in FIG. 8.

The following is an explanation of ejection of a standard CD 4 received in a slot 90. The kick lever 7 corresponding to the slot 90 where a desired standard CD 4 is stored, is pressed anti-clockwise in the direction of arrow A of FIG. 8. Then, by turning the kick lever 7 by finger or by some mechanical linkage around a kick-lever shaft 8, the disc carrier 10 is slid forward in the direction of arrow B of FIG. 8. And the standard CD 4 is ejected to a position as shown by two-dot chain line in FIG. 8. In this state, the standard CD 4 can be caught and transferred to another device, such as a CD player, or replaced by another disc. The disc carrier 10 and the kick lever 7 returns to the first position by the kick-lever spring 9 when the driving force to the kick lever 7 is removed.

The following is an explanation of retraction of a small type CD 34 having a diameter of 8 cm with reference to the drawing of FIG. 9. FIG. 9 shows an inside of a slot 90 wherein the small type CD 34 is received. When the small type CD 34 is inserted in a vacant slot 90, the small type CD 34 is positioned to the center part on left-right position by being pushed by both holder arms 21, 21. And, the small type CD 34 is automatically taken in the slot 90 after the maximum width part (namely the center part) of the small type CD 34 passes contact points of the small type CD 34 with the end tips of the holder arms 21, 21, in the same way as in the aforementioned the standard CD 4. At this time, as the small type CD 34 has a diameter of 8 cm, the periphery or edge of the small type CD 34 does not contact the inclined guide-faces 15, 15 of the elastic stoppers 13, 13. Thus, the edge of the small type CD 34 does not advance over the disc carrier 10, but touches the inner arc face 11 of the disc carrier 10. And, the small type CD 34 is received on the disc supporter 12 and below appendixes 14, 14 of the elastic stoppers 13, 13 as shown by a solid line in FIG. 9. Therefore, the small type CD 34 is held at a predetermined position in horizontal direction by both of the holder arms 21, 21 and the inner arc face 11 of the disc carrier 10. And in the vertical direction, the small type CD 34 is held by the disc supporter 12, the partition plate 3 and the two appendixes 14, 14 of the elastic stoppers 13, 13. And which type of CD being stored in which slot 90 can be easily confirmed from the observation of the opening 2 of the magazine case 1. This is because, that the front edges of the small type CD 34 stored are arranged near the opening 2, similarly to the front edges of the standard CD 4 being arranged near the opening 2. Therefore, there is no fear of the trouble that two CD are inserted in one slot 90.

In case of ejection of a small type CD 34 received in a slot 90, the kick lever 7 is pressed anti-clockwise in the direction of arrow A, in the same way as aforementioned ejection of the standard CD 4. Then, by turning the kick lever 7 around the kick-lever shaft 8, the disc carrier 10 is slid forward the direction of arrow B of FIG. 9. And the small type CD 34 is pushed out by the inner arc face 11 of the disc carrier 10. At the same time, both of the holder arms 21, 21 guide the small type CD 34 at center position on the opening of the slot 90 substantially. Finally, the small type CD 34 is ejected as shown by two-dot chain line in FIG. 9, namely at the same position as the standard CD 4 is ejected. In the operation of the kick lever 7, the connecting pin 20, which connects the left end of the kick lever 7 to the connecting portion 19, is rotated around the kick-lever shaft 8. Thus, the disc carrier 10 is slid out rotating a little. However, two positions of the connecting pin 20 on the kick lever 7 when the disc carrier 10 is at storing position and when the disc carrier 10 is at ejected position are on a line which is parallel to direction of insertion-ejection of disc. Thus, in same slot 90, an ejected position of a standard CD 4 and an ejected position of a small type CD 34 are on the same center line.

The following is a detailed description of the major components which constitute the disc magazine in accordance with the present invention.

Figure 10:
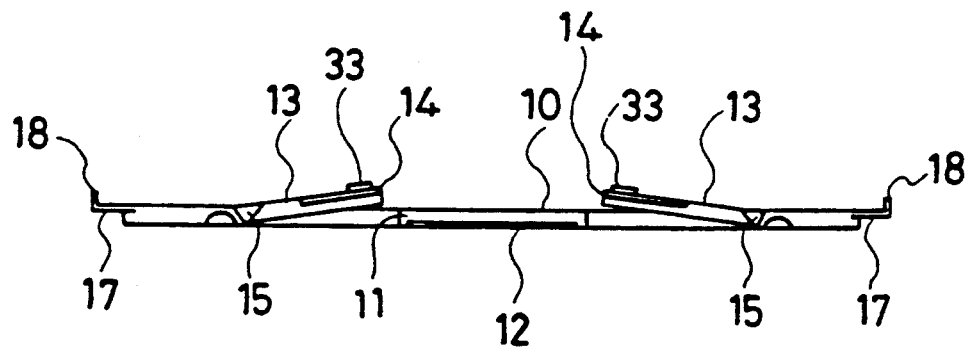
FIG. 10 is an elevational view of a disc carrier or FIG. 3.
Figure 11:
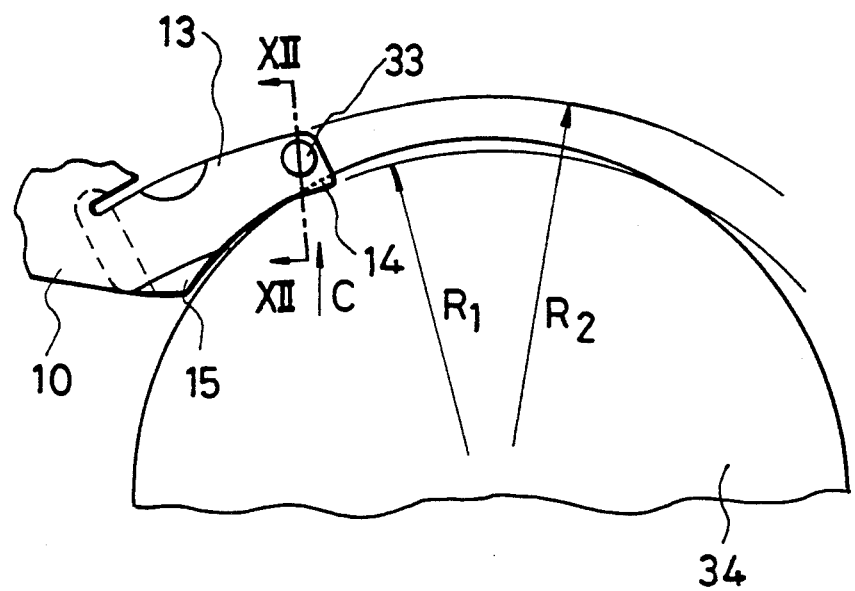
FIG. 11 is a partly enlarged view of a disc carrier of FIG. 3.
Figure 12:
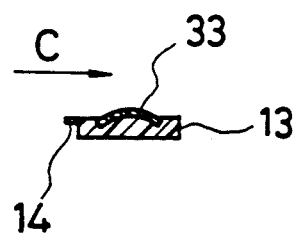
FIG. 12 is a cross-sectional view taken on line XVII—XVII of FIG. 11.
Figure 13:
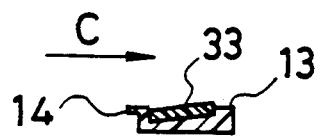
FIG. 13 is a sectional view of a modified form of a disc pad of FIG. 12.

FIG. 10 is an elevational view of the disc carrier 10 shown in FIG. 3. FIG. 11 is a partly enlarged view of a disc carrier 10 of FIG. 3. FIG. 12 is a cross-sectional view taken on line VII—VII of FIG. 11. FIG. 13 is a sectional view of a modified form of a disc pad 33 as shown in FIG. 12. Both side edges of the disc carrier 10 have thin plates 17 along the outer arc of the disc carrier 10 as shown in FIG. 2 and FIG. 10. The thin plates 17 have two vertical members 18, 18 for engaging with the grooved guide 5 of the magazine case 1. As shown in FIG. 11, the elastic stopper 13 including the appendix 14 has an inside arc which has larger radius than the radius of a small type CD 34 (8 cm) as shown by arrow $R_1$ of FIG. 11. And that, the inside arc shape of the elastic stopper 13 has smaller radius than a radius of a standard CD 4 (12 cm). As a result, periphery of a small type CD 34 is steadily received by and under an appendix 14 of the elastic stopper 13 and by the inner arc face 11 of the disc carrier 10, but does not contact the inclined guide-face 15. On the other hand, periphery of a standard CD 4 certainly contacts both of the inclined guide-face 15, 15 thereby to be loaded on the disc carrier 10 smoothly. Further the elastic stopper 13 including the appendix 14 has an outside arc shape whose radius is larger than a radius of a small type CD 34 as shown by arrow $R_2$ of FIG. 11. As a result, even if a known doughnut-shaped adapter for use for small type CD 34 is erroneously inserted in a slot 90 by a mistake, the adapter can be taken out smoothly similarly to taking out of the standard CD 4. The elastic stopper 13 have a disc pad 33 on the end tip of the upper face thereof. By the disc pad 33, a disc face of a standard CD 4 loaded on the disc carrier 10 is prevented from damaging and dusting. The disc pad 33 is made of non-woven fabric or felt. FIG. 12 shows a sectional view of the disc pad 33 comprising non-woven fabric. FIG. 13 shows a sectional view of another embodiment of the disc pad 33 comprising felt. Direction of arrow C in FIG. 12 and FIG. 13 shows insert directions of a standard CD 4. As shown in FIG. 12, the disc pad 33 is mounted in a recess on the upper face of the elastic stopper 13. The recess is formed convex shape, namely spherical face. In FIG. 13, the disc pad 33 is mounted in a recess on the upper face of the elastic stopper 13. A recess is formed having inclined bottom.

In FIG. 5 and FIG. 6, the liner sheet 29 and the thin film 44 are bonded on the partition plate 3 similarly to the aforementioned description. Rear ends (innermost ends) of the liner sheet 29 extend in the direction of back side where the disc carrier 10 adjoins thereto. And the extending portions of the liner sheet 29 is formed substantially in semicircular shape. The radius of curvature of an arc of the semicircular extending portion is larger than a radius of the small type CD 34. Thus, if an adapter for use in inserting a small type CD 34 to the conventional disc magazine for a standard CD 4 is inserted to the disc magazine of this embodiment by error, the adapter can be picked out smoothly because the inside circle of the adapter is not caught by the extended arc portion of the liner sheet 29.

The thin film 44 bonded on the lower liner sheet 29 is arranged under the disc carrier 10 and the disc supporter 12 and the inclined guide-face 15 of the elastic stopper 13 as shown in FIG. 2. As a result, when the standard CD 4 is inserted into the desired slot 90, the standard CD 4 does not contact the inclined guide-face 15 in the next upper slot 90, even if the edge of the standard CD 4 is slant upward.

Figure 14:
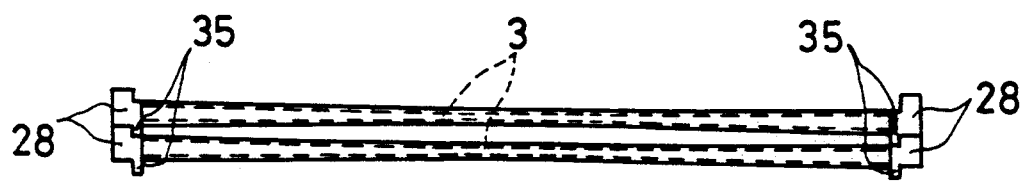
FIG. 14 is an elevational view of partition plates of the present invention.
Figure 15:
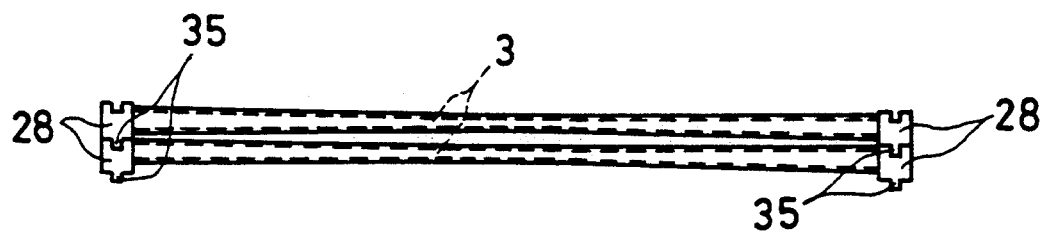
FIG. 15 is an elevational view of a modified form of a partition plates of FIG. 14.

FIG. 14 shows an elevational view of showing manner of piling up of the partition plates 3, 3 of the embodiment, shown in FIG. 5. Each one spacer 28 is provided on respective four corners (see FIG. 5) of the partition plate 3. The top and bottom faces of the spacers 28 have steps of corresponding shape, so that the top and bottom faces engage each other and is fixed when piled up. FIG. 15 shows an elevational view of a modified embodiment of the partition plates 3, 3 of FIG. 14. By providing the spacers 28, the partition plates 3 can be piled up firmly and certainly with accurate mutual positional relation. Therefore, the height of each slot 90 is given by the height of the spacers 28 only, and not influenced by the non-woven fabric and manner of its bonding. And, since the spacers 28 are firmly fixed each other, the partition plate 3 is prevented from deformation, and each slot 90 has accurate height.

Figure 16:
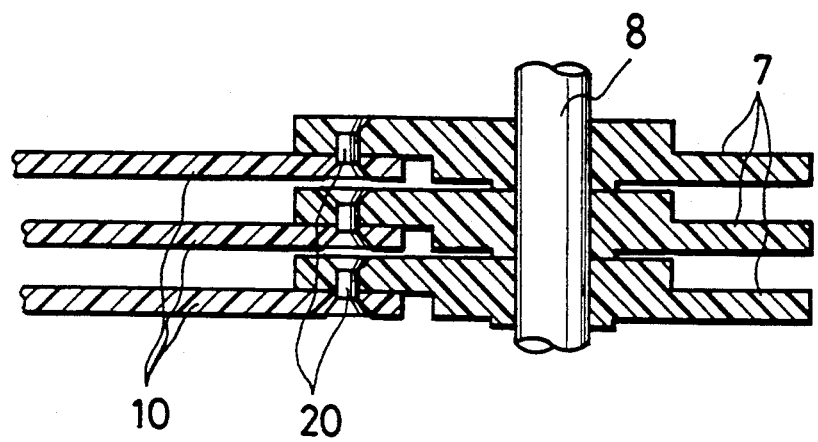
FIG. 16 is a sectional view of a connecting portion of a disc carrier of FIG. 2.
Figure 17:
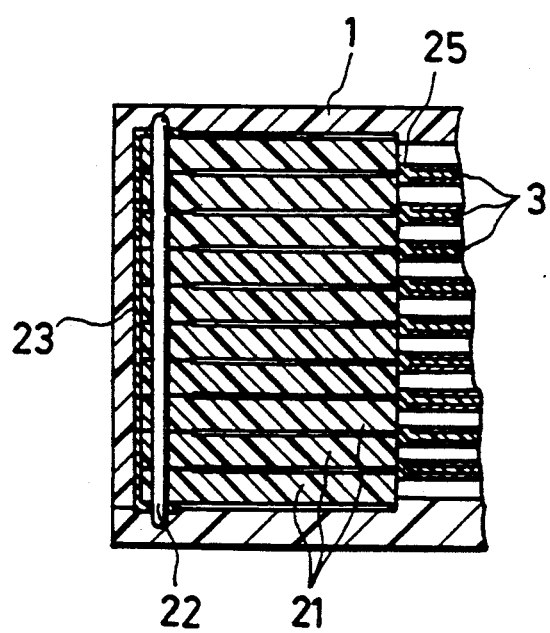
FIG. 17 is a cross-sectional view taken on line XVII—XVII of FIG. 2.

FIG. 16 is a sectional view of the connecting portion of the disc carriers 10 and kick levers 7. The connecting portion 19 of the disc carriers 10 are rotatably connected to the kick levers 7 by connecting pins 20, respectively. And, the kick levers 7 is pivoted by a common kick-lever shaft 8. Since the intervals between the piled-up partition plates 3 are selected equal to the intervals between the kick lever 7, and that the connecting portion 19 and the end of the kick levers 7 are connected by the pin 20, the partition plate 3 is held always horizontal with accurate intervals. FIG. 17 is a cross-sectional view taken on line XVII—XVII of FIG. 2. The holder arms 21, which are piled up, are provided rotatably around the arm pin 22 as shown in FIG. 17. FIG. 17 shows that holder arms 21, 21 . . . contact stoppers 25, 25 . . . , respectively. Since the stopper 25, which is provided in the notch 6 of the partition plate 3, is arranged at a close position to the arm pin 22, the height of the stopper 25 can be selected relatively high, namely slightly lower than the height of the rib 27. On account of the relatively high stopper 25, the holder arm 21 and the stopper 25 certainly contact each other. Since the stopper 25 is arranged close to the arm pin 22, the contact position on the holder arm 21 with the stopper 25 does not fluctuate much even if the partition plate 3 is somewhat deformed e.g. by heat. The stopper 25 may or may not be formed integrally with the partition plate 3.

Figure 18:
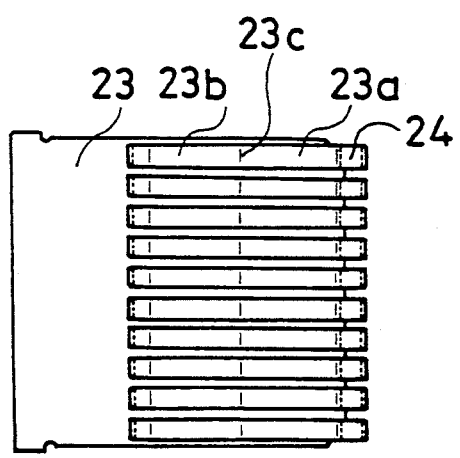
FIG. 18 is a side elevation view of an arm spring of FIG. 2.

FIG. 18 is an elevation view of the arm spring 23 of this embodiment. As shown in FIG. 2, the arm spring 23 comprises plural fingers each consisting of a first finger 23a which is connected via a turning section 24 and second fingers 23b which is extending from the first finger 23a. As shown in FIG. 2, there is a bending portion 23c between the first finger 23a and the second finger 23b. When the small type CD 34 is inserted to a slot 90, the end of the second finger 23b moves sliding on the side face of the holder arm 21. On the other hand, when the standard CD 4 is inserted to a slot 90, the bending portion 23c which is between the first finger 23a and the second finger 23b touches the holder arm 21. And, when the center part of the standard CD 4 passes, a free end of the second finger 23b of the arm spring 23 contacts with a spring stopper 23d adjacent to the arm pin 22. Therefore, the fulcrum point, whereat the force of the arm spring 23 pushes the holder arm 21 moves to more apart point from the arm pin 22. Hence, the holder arm 21 strongly presses the disc when the center portion of the standard CD 4 passes between both of the holder arms 21, 21. Furthermore, the arm spring 23 has the turning section 24 formed substantially in loop shape. The turning portion 24 has a minimum bend radius that is a necessary minimum condition for making a spring. Therefore, the turning section 24 retains an elastic force even when the holder arm 21 is rotated at the maximum angle, namely, when the center portion of the standard CD 4 passes end tips of the holder arm 21.

The holder arms 21, 21 may be formed in different shape from the above embodiment, in order to give a good feeling at the inserting or projecting a CD. For example, a side face of a holder arm 21 has a hollow for contacting a CD more certainty and/or the holder arm 21 is made of elastic material, and/or an arm spring 23 has an arcuate fingers for contacting a holder arm 21 gently.

Figure 19:
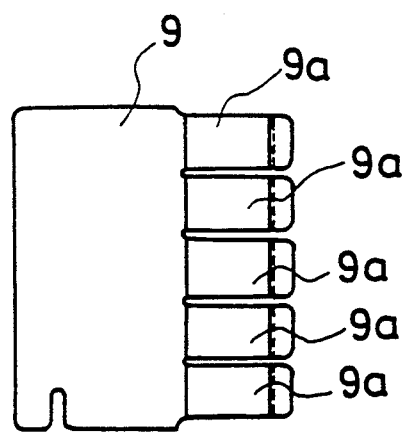
FIG. 19 is a side elevation view of a kick lever spring of FIG. 2.

FIG. 19 is an elevation view of the kick-lever spring 9 of this embodiment. The kick-lever spring 9 comprises plural fingers 9a which contact the kick levers 7 respectively. In case of this embodiment, one finger 9a of the kick-lever spring 9 has a considerable height (width of the finger 9a) so as to press two adjoining kick levers 7, 7. Therefore, the fingers 9a has an enough elastic force in spite of small size and thin material. And, the kick-lever spring 9 can operates certainly the disc carrier 10 to be returned.

In the state that several standard CD 4 and several small type CD 34 are mixedly received in the disc magazine in accordance with the present invention, by turning and returning all of the kick levers 7, the small type CD 34 only are ejected and kept in that state. On the other hand, at that time, the standards CD 4 are once ejected but then returned on the returning disc carrier 10. This is because, both the left and right holder arms 21, 21 in a slot 90 catch the periphery of the disc at the center portion of the small type CD 34, namely at the ejected position. Therefore, the only small type CD 34 can be selectively taken out from the disc magazine in accordance with the present invention.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A disc magazine comprising:
   a magazine case having a front opening,
   plural partition plates which are held horizontally in said magazine case so that a substantially straight formed horizontal front edge of each said partition plate extends across a substantial portion of a width of said front opening thereby defining plural horizontal slots between said substantially straight formed horizontal front edges of said plural partition plates for receiving a respective disc inserted from said front opening of said magazine case,
   plural disc carrier means which are held horizontally and slidably on and at a rear side of said plural partition plates in said magazine case and each of which has a stopping means having a substantially vertical face for abutting an inserted edge of a small disc, and
   plural disc supporter means provided on said plural disc carrier means for supporting rear edges of small discs, said plural disc supporter means having an inclined guide-face section for guiding inserted rear edges of large discs to override said plural disc supporter means and said stopping means so as to be received on said plural disc carrier means.

2. A disc magazine in accordance with claim 1, wherein said plural disc supporter means are provided on a front edge of said plural disc carrier means.

3. A disc magazine in accordance with claim 1, wherein said plural disc supporter means comprise at least one of an upper stopper portion for covering and preventing a small disc from moving upwardly, and a lower stopper portion for receiving and preventing a small disc from moving downwardly.

4. A disc magazine in accordance with claim 1, wherein said disc carrier means is formed in a substantially semi-circular shape and has a thin part at a periphery thereof, and said case has a grooved guide for engaging said thin part.

5. A disc magazine in accordance with claim 1 or claim 2, wherein said disc carrier means is connected by a connecting pin to an end of a kick lever for sliding said disc carrier means, two positions of said connecting pin on said kick lever, one where the disc carrier means is at a storing position and the other where the disc carrier means is at a ejected position, being on a line which is parallel to a direction of insertion-ejection of discs.

6. A disc magazine in accordance with claim 1 which further comprises:
a groove guide for horizontally and slidably supporting both sides of said disc carrier means, and
a kick lever which supports a rear side of said disc carrier means.

7. A disc magazine in accordance with claim 1 which further comprises:
a pressing means for pressing said disc carrier means to a rear side of said magazine case.

8. A disc magazine in accordance with claim 1 which further comprises:
hold arms, each of which is pivoted by arm pins provided adjacent both sides of said front opening, and has a free-end arranged inwardly of said case with respect to said arm pin, and
pressing means for pressing outer sides of said hold arms,
whereby an edge of a disc in a slot is pressed by said free-ends of said hold arms.

9. A disc magazine in accordance with claim 1, wherein each partition plate comprises a plate-shaped member and spacers provided on both ends thereof, each said spacer having engaging steps formed therein to thereby allow a stacking of said partition plates to form slots therebetween.

10. A disc magazine in accordance with claim 2, wherein said plural disc supporter means comprises at least one elastic stopper provided on said disc carrier means slanted upwardly from an upper surface of said disc carrier means to stop a small disc from being inserted thereonto.

11. A disc magazine in accordance with claim 3, wherein said stopping portion of said plural disc carrier means has an arc-shaped, and said lower stopper portion extends stepwise from the bottom of said stopping portion.

12. A disc magazine in accordance with claim 3 or claim 11, wherein
said lower stopper portion is defined between two projections provided on said partition plate.

13. A disc magazine in accordance with claim 1, wherein
a front edge of a large disc projected from a slot and a front edge of a small disc projected from a slot are disposed at substantially the same position, when said kick levers are turned by an ejecting operation.

14. A disc magazine in accordance with claim 1, wherein a front edge of a large disc when received in a slot and a front edge of a small disc when received in the slot are disposed at substantially the same position with respect to said front opening.

15. A disc magazine in accordance with claim 6, wherein a single desired size of discs are held at an ejected position and other disc sizes are returned when said kick levers are released.

16. A disc magazine in accordance with claim 8, wherein
said holder arms are rotatable by said arm pin and are urged to one direction,
said partition plates stop said free-ends of said holder arms respectively.

17. A disc magazine in accordance with claim 8 which further comprises:
an arm spring having a bending portion projecting toward a side face of said holder arm, said bending portion pressing said holder arm when said holder arm is rotated in fixed angle overcoming force of said arm spring.

18. A disc magazine in accordance with claim 8 or claim 17, wherein
an arm spring is transformed by rotating said holder arm after a free end of said arm spring contacts with a spring stopper of said magazine case.

19. A disc magazine in accordance with claim 10, wherein
an upper stopper portion is provided on an upper side of said elastic stopper.

20. A disc magazine in accordance with claim 10, wherein
said disc carrier means comprises a disc pad provided on an upper face of a free-end of said elastic stopper.

21. A disc magazine in accordance with claim 10, wherein a pair of elastic stoppers have said contact portion arranged substantially on a part of an extension of an arc of said stopping portion of said disc carrier means, and provided elastically on said disc carrier means, and projected to be slanted in an upward direction.

22. A disc magazine in accordance with claim 11, wherein an extended portion toward said rear side of said magazine case is provided on said partition plate, said extended portion being arranged to override at least a front end of one of upper and under faces of said lower stopper portion.

23. A disc magazine in accordance with claim 8 or claim 18, wherein
a distance between free-ends of both of said holder arms at their resting positions is smaller than the diameter of said small disc.

24. A disc magazine in accordance with claim 16, wherein a stopper for stopping said holder arm is provided on an edge portion of said partition plate and is thicker than a thickness of said partition plate and lower than a height of ribs which are provided on said partition plate, said stopper being at a position close to said front opening and being cut off as a triangular portion.

25. A disc magazine in accordance with claim 20, wherein said disc pad is mounted on one of a convex part and a slant bottom plane in a recessed part of said upper face.

26. A disc magazine in accordance with claim 21, wherein
said elastic stopper has a hinge portion provided on its outer side and an inclined guide-face provided on the front side of said elastic stopper.

27. A disc magazine in accordance with claim 11 or claim 26, wherein said disc carrier means is made of elastic material, and said inclined guide-face portions of said elastic stopper on said disc carrier means are vertically shiftable by bending up or down by a rear side of a large disc when inserted.

28. A disc magazine in accordance with claim 21, wherein
an outer shape of said elastic stopper has an arc line which has larger radius than a radius of a small disc.

29. A disc magazine in accordance with claim 21, wherein a radius of a front edge of said elastic stopper has upper stopper portions which are formed to have a smaller radius than a radius of a large disc.

30. A disc magazine in accordance with claim 21, wherein a radius of a front edge of said elastic stopper has upper stopper portions which are formed to have a larger radius than a radius of a small disc.

31. A disc magazine in accordance with claim 21, wherein a center of an arc of said front edge of said elastic stopper is on a center line defined by connecting centers of a large disc and a small disc.

32. A disc magazine in accordance with claim 22, wherein
an arc shape of said extended portion has a radius which is larger than a radius of a small disc.

33. A disc magazine in accordance with claim 27, wherein
an extended portion covers an underside of said lower stopper portion and an inclined guide-face section.

34. A disc magazine in accordance with claim 22 or claim 33, wherein
said extended portion consists of cloth fixed on a pair of projections, whereto a thin film such as resin film is fixed under said extended potion.

35. A disc magazine in accordance with claim 34, wherein
said resin film is arranged under, across and further extending outside of two projections.

36. A disc magazine in accordance with claim 33, wherein
said extended arc portion has an upper and a lower arc-shaped sheets which are extended from upper face and rear face of said partition plate, respectively, wherein lower stopper portion is inserted between said upper and lower arc-shaped sheets.

37. A disc magazine in accordance with claim 33, wherein
width of said extended portion is larger than a diameter of a small disc.

* * * * *

UNITED STATES PATENT AND TRADEMARK OFFICE
CERTIFICATE OF CORRECTION

PATENT NO. : 5,058,100
DATED : October 15, 1991
INVENTOR(S) : YOSHII, Tetsuji It is certified that error appears in the above-identified patent and that said Letters Patent is hereby corrected as shown below:

On the Title page, the first-listed priority date should read:

[30]    Foreign Application Priority Data

Aug. 18, 1988 [JP]    Japan .................63-205175

Signed and Sealed this

Eighth Day of March, 1994

Attest:

BRUCE LEHMAN

*Attesting Officer*                *Commissioner of Patents and Trademarks*